(12) United States Patent
Zhu (10) Patent No.: US 9,798,713 B2
(45) Date of Patent: Oct. 24, 2017

(54) METHOD FOR CONFIGURING APPLICATION TEMPLATE, METHOD FOR LAUNCHING APPLICATION TEMPLATE, AND MOBILE TERMINAL DEVICE

(71) Applicants: HISENSE MOBILE COMMUNICATIONS TECHNOLOGY CO., LTD, Qingdao, Shandong (CN); HISENSE USA CORPORATION, Suwanee, GA (US)

(72) Inventor: Ping-Yang Zhu, Shandong (CN)

(73) Assignees: HISENSE MOBILE COMMUNICATIONS TECHNOLOGY CO., LTD, Qingdao, Shandong (CN); HISENSE USA CORP., Suwanee, GA (US)

( * ) Notice: Subject to any disclaimer, the term of this patent is extended or adjusted under 35 U.S.C. 154(b) by 329 days.

(21) Appl. No.: 14/316,210

(22) Filed: Jun. 26, 2014

(65) Prior Publication Data
US 2015/0278186 A1  Oct. 1, 2015

(30) Foreign Application Priority Data
Mar. 31, 2014  (CN) .......................... 2014 1 0127634

(51) Int. Cl.
*G06F 3/048* (2013.01)
*G06F 3/00* (2006.01)
(Continued)

(52) U.S. Cl.
CPC .......... *G06F 17/248* (2013.01); *G06F 3/0482* (2013.01); *G06F 3/04842* (2013.01); *G06F 9/4443* (2013.01); *G06F 9/44505* (2013.01)

(58) Field of Classification Search
CPC .. G06F 17/248; G06F 3/0482; G06F 3/04842; G06F 9/4443; G06F 9/44505; G06F 3/048; G06F 3/00; G06F 17/00
See application file for complete search history.

(56) References Cited

U.S. PATENT DOCUMENTS 8,291,344 B2 * 10/2012 Chaudhri ............ G06F 3/04883
715/736
8,907,977 B2 * 12/2014 Roth ...................... G06F 3/0485
345/619

(Continued)

*Primary Examiner* — Jennifer To
*Assistant Examiner* — Hugo Molina
(74) *Attorney, Agent, or Firm* — Tim Tingkang Xia, Esq.; Lock Lord LLP (57) ABSTRACT

A method for configuring an application template. A mobile terminal device receives a command input by a user for requesting to create the application template. The application template is configured to indicate an application required to be launched and a layout of a window of the application required to be launched on a screen, and to instruct launching of the application. The mobile terminal device, according to the command for requesting to create the application template, acquires information of identifiers of all of the applications currently displayed on the screen and information of the layout of the window of each of the applications on the screen, and then creates the application template. The application template corresponds to the acquired information of the identifier of a corresponding application and the information of the layout of the window of the corresponding application on the screen.

16 Claims, 4 Drawing Sheets

(51) Int. Cl.
  *G06F 17/00*   (2006.01)
  *G06F 17/24*   (2006.01)
  *G06F 3/0482*  (2013.01)
  *G06F 3/0484*  (2013.01)
  *G06F 9/44*    (2006.01)
  *G06F 9/445*   (2006.01)

(56) References Cited

U.S. PATENT DOCUMENTS

| | | | |
|---|---|---|---|
| 9,250,761 B2 * | 2/2016 | Vranjes | G06F 3/0481 |
| 2008/0034317 A1 * | 2/2008 | Fard | G06F 3/0481 715/781 |
| 2009/0293007 A1 * | 11/2009 | Duarte | G06F 3/0481 715/767 |

* cited by examiner

METHOD FOR CONFIGURING APPLICATION TEMPLATE, METHOD FOR LAUNCHING APPLICATION TEMPLATE, AND MOBILE TERMINAL DEVICE

CROSS-REFERENCE TO RELATED APPLICATION

This application claims the priority to Chinese Patent Application No. 201410127634.3, filed on Mar. 31, 2014, in the State Intellectual Property Office of PR. China, which is hereby incorporated herein in its entirety by reference.

FIELD OF THE DISCLOSURE

The present disclosure relates generally to communication technologies, and more particularly, to a method for configuring an application template, a method for launching an application template, and a mobile terminal device.

BACKGROUND

With the widespread of intelligent operating systems, demands of users for various software application programs (hereinafter "applications" or "apps" for short) grow on a daily basis. A mobile terminal device operated by an intelligent operating system may generally have many different applications being installed therein or as built-in applications, from which a user may operate these different applications. Generally, when an application is started or launched, a window of the application is displayed in a full-screen manner on a display area of a screen of the mobile terminal device. When another application is subsequently launched, a window of the subsequently launched application will cover the window of the previously launched application in the full-screen manner on the display area of the screen of the mobile terminal device, thereby making the previously launched application invisible.

SUMMARY

In one aspect, the present disclosure relates to a method for configuring an application template. In one embodiment, the method includes receiving, by a mobile terminal device, a command input by a user for requesting to create the application template, where the application template is configured to indicate at least one application to be launched and a layout of a window of each of the at least one application to be launched on a screen, and to instruct launching of the at least one application; acquiring, by the mobile terminal device, information of identifiers of all of the applications currently displayed on the screen and information of the layout of the window of each of the applications on the screen according to the command for requesting to create the application template; and creating, by the mobile terminal device, the application template according to the command for requesting to create the application template, where the application template corresponds to the acquired information of the identifier of the applications and the information of the layout of the window of each of the applications on the screen.

In another aspect, the present disclosure relates to a method for launching an application template. In one embodiment, the method includes receiving, by a mobile terminal device, a command input by a user for launching the application template; acquiring, by the mobile terminal device, a corresponding application template according to the received command for launching the application template, where the acquired application template corresponds to information of an identifier of an application and information of a layout of a window of the application on a screen; and launching, by the mobile terminal device, the application corresponding to the information of the identifier, and setting the window of the launched application on the screen based on the information of the layout.

In yet another aspect, the present disclosure relates to a mobile terminal device. In one embodiment, the mobile terminal device includes a memory storing one or more computer readable codes, and one or more processors configured such that when the one or more computer readable codes are executed at the one or more processors, the mobile terminal device receives a command input by a user for requesting to create an application template, where the application template is configured to indicate at least one application to be launched and a layout of a window of each of the at least one application to be launched on a screen, and to instruct launching of the at least one application; acquires information of identifiers of all of the applications currently displayed on the screen and information of the layout of the window of each of the applications on the screen according to the command for requesting to create the application template; and creates the application template according to the command for requesting to create the application template, where the application template corresponds to the acquired information of the identifiers of the applications and the information of the layout of the window of each of the applications on the screen.

These and other aspects of the disclosure will become apparent from the following description of several embodiments taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION OF THE DISCLOSURE

The disclosure will now be described hereinafter with reference to the accompanying drawings, in which several embodiments of the disclosure are shown. This disclosure may, however, be embodied in many different forms and should not be construed as limited to the embodiments set forth herein. The terms used in this specification generally have their ordinary meanings in the art, within the context of the disclosure, and in the context where each term is used. Certain terms that are configured to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

It will be understood that, although the terms first, second, third etc. may be used herein to describe various elements, components, regions, layers and/or sections, these elements, components, regions, layers and/or sections should not be limited by these terms. These terms are only configured to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

As used herein, the term "unit", or "module" may refer to, be part of, or include software and/or hardware components, such as an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term unit or module may also include memory (shared, dedicated, or group) that stores code executed by the processor.

The description will be made as to the embodiments of the disclosure in conjunction with the accompanying drawings in FIGS. 1-6. It should be understood that embodiments described herein are merely used for explaining the disclosure, but are not intended to limit the disclosure. In accordance with the purposes of this disclosure, as embodied and broadly described herein, this disclosure, in certain aspects, relates to a method of configuring an application template, a method of launching an application template, and a mobile terminal device.

Figure 1:
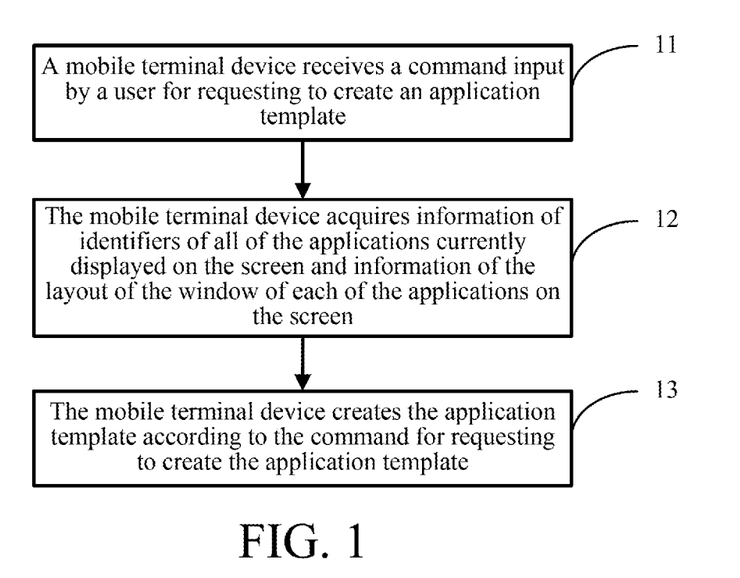
FIG. 1 is a schematic flow chart of a method of configuring an application template according to one embodiment of the present disclosure.

Referring to FIG. 1, a schematic flow chart of a method of configuring an application template is shown according to one embodiment of the present disclosure. In the exemplary embodiment, the method includes the following steps:

Step 11: A mobile terminal device receives a command input by a user for requesting to create an application template.

In certain embodiments, the application template may include one or a combination of an image, text, animation, a video, and the like. Further, the application template corresponds to information of an application that is launched and currently displayed on a screen, such as information that can be used to identify the application, e.g., a name, a LOGO, and/or a thumbnail of the application. For example, when one application, e.g., a Google Maps application, is currently launched on the screen, an application template corresponding to the Google Maps application may include information that can be used to recognize the Google Maps application, such as an icon of the Google Maps application or a thumbnail of the Google Maps application. In another example, when two applications, e.g., the Google Maps application and a short messaging service (SMS) (or instant messaging service) application, are concurrently launched, the two applications are displayed in a manner of multiple windows being tiled or cascaded, an application template corresponding to the two applications may include, for example, two thumbnails of icons of the two applications that can be used to respectively identify the Google Maps application and the SMS application.

In certain embodiments, the application template may include one or a combination of an image, text, animation, a video, and the like, and the application template corresponds to information of an application currently displayed on a screen of the mobile terminal device. The displayed information may include one or more of a name of the application, content of a current window of the application, a size and a position of the window on the screen, and the like. For example, when the application template correspond to a Google Maps application and a SMS application, the application template may correspond to one or more of a name, content of a current window, a size and a position of the window on the screen, and the like for the Google Maps application, and further one or more of a name, content of a current window, a size and a position of the window on the screen, and the like for the SMS application. When the Google Maps application and the SMS application are launched according to the application template, a display state of the two applications may be identical with, or may also be different from, an original state when the application template is created.

In certain embodiments of the present disclosure, a user who intends to create the application template may input the command for requesting to create the application template to the mobile terminal device. In certain embodiments, the application template is configured to instruct launching of at least one application, and may further correspond to indicating at least one application to be launched and a layout of a window of the at least one application to be launched on a screen. After the application template is created, the application template may further be saved in a preset area (for example, an interface or a list) of the mobile terminal device, such that the user may find an intended application template from the preset area, and launch, through the application template, the at least one application corresponding to the application template. When the at least one application is launched, content of the window of the launched application may be the content of the window displayed on the screen of the mobile terminal device when the application template is created. For example, the content of the window may be content of the window corresponding to one activity of one application, content of the window corresponding to a plurality of activities of one application, or content of the window corresponding to a plurality of activities of a plurality of applications. In addition, the content of the window may be content of one window displayed in a full-screen manner, content of a plurality of windows displayed in a manner of tiled windows, or content of a plurality of windows displayed in a manner of cascaded windows.

During implementation, the mobile terminal device may collect a command for requesting to create an application template that is input by a user on a touchscreen, and may further collect the command for requesting to create an application template that is input by a user in a shortcut key manner. For example, the mobile terminal device may configure to set a key combination of pressing synchronously at least two buttons of a volume up button, a power button, and a mute button as one of the operations for the command for requesting to create an application template. When the user presses the volume up button and the power button synchronously, the mobile terminal device collects the command for requesting to create an application template that is input by the user in a shortcut key manner. In another example, the mobile terminal device may configure to set a different key combination of synchronous touch control of a combination of two random touch function buttons (such as a menu button, a HOME button, a return button, a search button), or a key combination of synchronous touch control or sequential touch control of at least one touch function button and at least one preset display area on the screen as the operations for the command for requesting to create an application template. However, the foregoing key combinations are provided only as examples that can be configured as the preset operations for the command for requesting to create an application template.

Step 12: The mobile terminal device acquires, according to the command for requesting to create the application template, information of identifiers of all of the applications currently displayed on the screen and information of the layout of the window of each of the applications on the screen.

The information of the identifier of an application refers to information that can be used for identifying the application, such as the content currently displayed in a window of the application. The information of the layout of the window of each of the applications on the screen may include a position of the window of each application on the screen, a size of the window, and the like.

During implementation, after receiving the command for requesting to create an application template, the mobile terminal device acquires data structures AppInfo of all applications that are launched and currently displayed on the screen. In certain embodiments, the data structure AppInfo of an application may include the following data items:

appName Name of application;
appLocation Launch position of application (i.e., the position where the application is distributed or displayed in a display area on the screen of the mobile terminal device);
appDisplay Current page information of application (i.e., content currently displayed in the window of the application); and
appPosition Size and position of window of application on the screen.

It should be noted that the data structure AppInfo of an application is not limited to the foregoing listed data items, and may further include other items that are not listed. In addition, the data structure AppInfo of the application may include one or more of the foregoing listed data items.

For example, the data structure AppInfo of an application "ManyA.apk" may include the following data items:

appName ManyA;
appLocation com.android.Manyactivity;
appDisplay com.android.Manyactivity/.Manyactivity1; and
appPosition 50, 50, 320, 480.

If two and more applications are currently displayed on the screen, the mobile terminal device acquires the data structure AppInfo of each application, and sequentially saves the data structure AppInfo of each application in a data structure array AppInfoArrary, in which the data structure array AppInfoArrary includes data structures of one or more applications, i.e., includes one or more data structures.

In one embodiment, after the Step 12 is performed, the mobile terminal device may generate a thumbnail according to content currently displayed at a display area of the screen, where the thumbnail may include an icon of a current application and/or a displayed content of the current application. In this case, the application template further includes the generated thumbnail.

During implementation, after receiving the command for requesting to create an application template, the mobile terminal device may further generate a thumbnail templateIcon in a manner of capturing a screenshot of the current screen, and saves the thumbnail templateIcon in the application template TemplateInfo.

Step 13: The mobile terminal device creates an application template according to the command for requesting to create the application template.

In one embodiment, the application template includes the acquired information of the identifiers of the applications and information of the layout of the windows of the applications on the screen.

During implementation, the application template TemplateInfo in the embodiments of the present disclosure may include: one data structure array AppInfoArrary, a name of the application template, and a thumbnail of the application template. In certain embodiments, the data structure of the application template TemplateInfo may include one or more of the following data items:

AppInfoArrary Data structure array;
templateName Name of application template; and
templateIcon Thumbnail of application template.

It should be noted that the data structure of the TemplateInfo is not limited to the foregoing listed data items, and may further include other data items that are not listed. In addition, the data structure of TemplateInfo may include one or more of the foregoing listed data items.

The solution is applicable in a case in which only one application is currently opened on a screen of a mobile terminal device, and the application is displayed in a full-screen manner or displayed in a window manner. In one embodiment, only one Google Maps application is currently opened on a screen of a mobile terminal device, and the Google Maps application is displayed in a full-screen manner or displayed in a window manner. After receiving the command for requesting to create an application template, the mobile terminal device acquires information of the identifier of the Google Maps application and information of a layout of a window of the Google Maps application on the screen. The mobile terminal device then creates an application template according to the information of the identifier of the Google Maps application and information of the layout of the window of the Google Maps application on the screen. The application template may include one or a combination of any image, animation, text, and the like of the Google Maps application, which enable a user to identify that the application template corresponds to the Google Maps application. It should be noted that when a user launches the Google Maps application through the application template after the application template corresponding to the Google Maps application is created, a window of the Google Maps application being launched may be identical with the displayed window of the Google Maps application when the application template is created.

The solution is also applicable in a case in which two or more applications are currently opened on a screen of a mobile terminal device. The two or more applications are displayed in a window manner, and are displayed on the screen in a cascaded or tiled manner. In one embodiment, two applications, including a Google Maps application and a SMS application, are currently launched and displayed on a screen as an example. The Google Maps application and the SMS application are both displayed in a cascaded or tiled window manner on the screen. In certain embodiments, one of the Google Maps application and the SMS application may be displayed in a full screen manner, and the other may be displayed in a window manner. After receiving the command for requesting to create an application template, the mobile terminal device acquires information of an identifier of the Google Maps application, information of a layout of a window of the Google Maps application on the screen, information of an identifier of the SMS application, and information of a layout of a window of the SMS application on the screen. The mobile terminal device then creates an application template according to the obtained information of the identifier of the Google Maps application, information of the layout of the window of the Google Maps application on the screen, information of the identifier of the SMS application, and information of the layout of the window of the SMS application on the screen. The application template may include one or a combination of any image, animation, text, and the like of the Google Maps application and the SMS application, which enables a user to identify that the application template corresponds to the Google Maps application and the SMS application. It should be noted that, when a user launches the Google Maps application and the SMS application through the application template after the application templates corresponding to the Google Maps application and the SMS application are created, the windows of the Google Maps application and the SMS application being launched may be identical with the displayed windows of the Google Maps application and the SMS application when the application template is created. For example, when the Google Maps application and the SMS application are launched through the application template corresponding to the Google Maps application and the SMS application, the window of the Google Maps application on the screen may display the main page of the Google Maps application, and the window of the SMS application on the screen may display the main page of the SMS application.

When the mobile terminal device creates at least two application templates, the mobile terminal device saves data structures of the application templates in an application template array TemplateInfoArrary sequentially. In other words, the application template array TemplateInfoArrary includes at least one application template. In one embodiment, the application template array may be opened through a preset operation, and the preset operation may be, for example, pressing a preset operation button, or may further be touching or dragging a preset area or a preset identifier on an operation screen. After the application template is created, when a corresponding application is launched through an application template, the window of the launched application may be a window identical with that of the application when the application template is created, or may also be other windows, such as homepage windows, of the corresponding applications. For example, when the Google Maps application is launched through the template of the Google Maps application, a window of the Google Maps application on the screen may be identically displayed (for example, the position of the window, the content displayed in the window, and the like) with a previous window of the Google Maps application when the application template is saved. Alternatively, a window of the Google Maps application on the screen may be differently displayed from a previous window of the Google Maps application when the application template is saved. For example, a homepage window of the Google Maps application may be displayed, and the position of the window of the Google Maps application, the content displayed in the window, and the like may be different from those of a previous window of the Google Maps application when the application template is saved.

In addition, after creating at least one application template, the mobile terminal device may update the information in the application template. For example, the mobile terminal device may update information of an identifier, information of a layout, and the like in the application template. In one embodiment, the information in the application template may be updated by adopting the following manner:

The mobile terminal device receives a command input by a user for updating an application template. It should be noted that the user who input the command for updating an application template may be the same user who input the command for launching the application template, or may be a different user. Then the mobile terminal device retrieves an application template corresponding to the command for updating an application template, and updates, according to the command for updating an application template, information of an identifier and/or information of a layout in the retrieved application template.

In addition, after creating at least one application template, the mobile terminal device may further delete one or more application template. In one embodiment, the application template may be deleted by adopting the following manner:

The mobile terminal device receives a command input by the user for deleting an application template. It should be noted that the user who input the command for deleting an application template may be the same user who input the command for launching the application template, or may be a different user. Then the mobile terminal device deletes, according to the command for deleting an application template, an application template corresponding to the command for deleting an application template.

In addition, the application template may further include information of a launch position of an application and/or information for indicating a focus window. The information for indicating a focus window is configured to indicate a window in focus. In certain embodiments, the term "focus" may refer to the window or any other component of a graphical user interface (GUI) being selected to receive input. For example, text entered at the keyboard or pasted from a clipboard is sent to the component which has the focus. Generally, the window in focus refers to the window currently in operation. In certain embodiments, when multiple windows are concurrently on the screen, only one of these windows (i.e., the window on which the cursor is currently located) may be in operation. The data structure AppInfo of the application may include:

appName Name of application
appLocation Launch position of application
appDisplay Information of current page of application
appPosition Size and position of window of application on screen
appFocus Information for indicating focus window It should be noted that the data structure AppInfo of an application is not limited to the foregoing listed data items, and may further include other items that are not listed. In addition, the data structure AppInfo of the application may include one or more of the foregoing listed data items.

Figure 2:
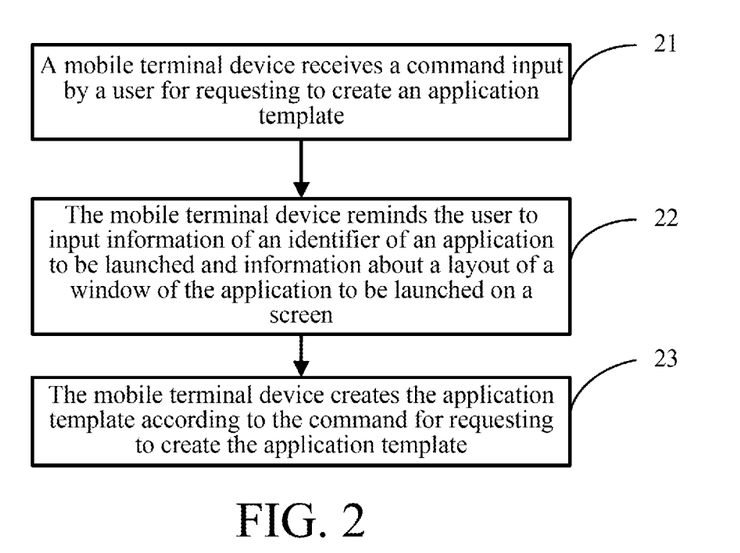
FIG. 2 is a schematic flow chart of a method of configuring an application template according to another embodiment of the present disclosure.

FIG. 2 is a schematic flow chart of a method of configuring an application template according to another embodiment of the present disclosure. As shown in FIG. 2, the method may include the following steps:

Step 21: A mobile terminal device receives a command input by a user for requesting to create an application template.

The application template may be one or a combination of an image, text, animation, a video, and the like. In certain embodiments, the application template corresponds to information of an application that is launched and currently displayed on a screen, such as information that can be used to identify the application, e.g., a name, a LOGO, and/or an thumbnail of the application. In some other embodiments, the application template corresponds to information of the application currently displayed on a screen of the mobile terminal device, and the displayed information may include one or more of a name of the application, content of a current window of the application, a size and a position of the window on the screen, and the like.

In one embodiment, the command for requesting to create an application template is used for requesting to create an application template, where the application template is configured to instruct launching of at least one application, and may further correspond to indicating at least one application to be launched and a layout of a window of the at least one application to be launched on a screen.

Step 22: The mobile terminal device reminds, according to the command for requesting to create an application template, the user to input information of an identifier of the application to be launched and information of a layout of a window of the application to be launched on a screen.

In one embodiment, after receiving a command input by a user for requesting to create an application template, the mobile terminal device reminds the user to input information of an identifier of the application to be launched and information of a layout of a window of the application to be launched on the screen, and saves the foregoing information of the identifier of the application to be launched and the information of the layout of the window of the application. In addition, the mobile terminal device may further remind the user to select a thumbnail used for identifying the application template, and the thumbnail may be acquired in a manner of capturing a screenshot, or may be selected by the user. For example, the user may select any image saved in the mobile terminal device as a thumbnail, or may also select any image on a network and download the image for use as a thumbnail.

Step 23: The mobile terminal device creates an application template, where the application template corresponds to the information of the identifier of the application to be launched and the information of the layout of the window of the application to be launched on the screen.

In one embodiment, after the mobile terminal device creates at least one application template, the mobile terminal device may receive a command input by the user for updating the application template. Then the mobile terminal device retrieves an application template corresponding to the command for updating an application template, and updates, according to the command for updating an application template, information of an identifier and/or information of a layout in the retrieved application template. During implementation, an interface of an application template may be launched and changed by clicking on an application template for a long time (e.g., clicking to exceed a preset time).

In one embodiment, after the mobile terminal device creates at least one application template, the mobile terminal device may receive a command input by the user for deleting an application template. Then the mobile terminal device deletes, according to the command for deleting an application template, an application template corresponding to the command for deleting an application template.

In one embodiment, the application template may further include information of a launch position of an application and/or information for indicating a focus window. The information for indicating a focus window is configured to indicate a window in focus.

Figure 3:
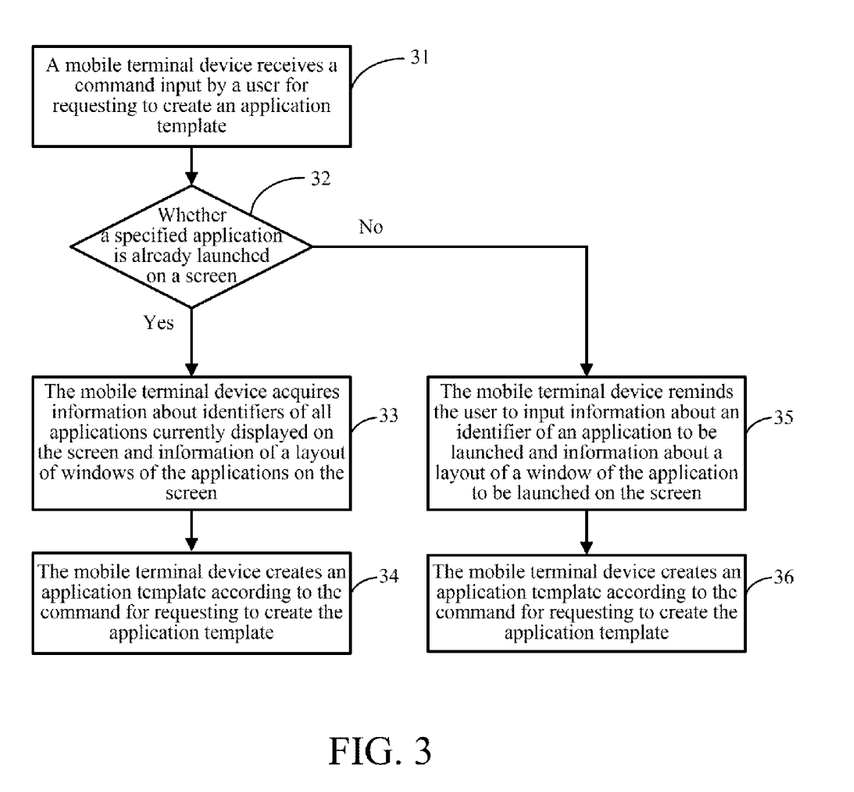
FIG. 3 is a schematic flow chart of a method of creating an application template according to one embodiment of the present disclosure.

FIG. 3 is a schematic flow chart of a method of creating an application template according to one embodiment of the present disclosure. In the exemplary embodiment, as shown in FIG. 3, the method may include the following steps:

Step 31: A mobile terminal device receives a command that is input by a user and requests to create an application template.

In one embodiment, the command for requesting to create an application template is used for requesting to create an application template, where the application template is configured to instruct launching of at least one application, and may further correspond to indicating at least one application to be launched and a layout of a window of the at least one application to be launched on a screen.

Step 32: The mobile terminal device determines whether a specified application is already launched currently on a screen.

The specified application may be an application that needs to be created in an application template. In other words, the application may be included in a list, which includes applications that need to be created in the application template. The list may include common applications such as a browsing tool and a chat tool. In one embodiment, the application may be a program that is already launched at a front end, which may include common applications and system programs.

During implementation, if a specified application is already currently launched on the screen of the mobile terminal device, the mobile terminal device executes Step 33. Alternatively, if a specified application is not currently launched on the screen in the mobile terminal device, the mobile terminal device executes Step 35.

Step 33: The mobile terminal device acquires, according to the command for requesting to create an application template, information of identifiers of all applications currently displayed on the screen and information of a layout of windows of the applications on the screen.

Step 34: The mobile terminal device creates an application template according to the command for requesting to create an application template.

The implementation of the Step 33 and the Step 34 may be the same as the implementation of the Step 12 and the Step 13, and the optional implementation manners for the Step 12 and the Step 13 may all be implemented for the Step 33 and the Step 34. Thus, details of the implementations are no longer elaborated here.

Step 35: The mobile terminal device reminds, according to the command for requesting to create an application template, the user to input the information of the identifier of the application to be launched and the information of the layout of the window of the application to be launched on the screen.

Step 36: The mobile terminal device creates an application template, where the application template corresponds to the information of the identifier of the application to be launched and the information of the layout of the window of the application to be launched on the screen.

The implementation of the Step 35 and the Step 36 may be the same as the implementation of the Step 22 and the Step 23, and the optional implementation manners for the Step 22 and the Step 23 may all be implemented for the Step 35 and the Step 36. Thus, details of the implementations are no longer elaborated here.

Figure 4:
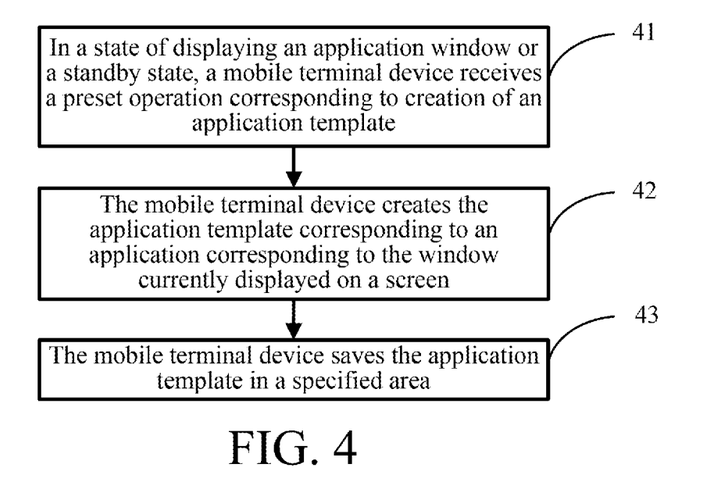
FIG. 4 is a schematic flow chart of a method of creating an application template according to another embodiment of the present disclosure.

FIG. 4 is a schematic flow chart of a method of creating an application template according another embodiment of the present disclosure. As shown in FIG. 4, the method may include the following steps:

Step 41: In a state of displaying an application window or a standby state, a mobile terminal device receives a preset operation corresponding to creation of an application template.

The state of displaying an application window corresponds to a window of at least one application that is currently displayed on a screen, and the window may be displayed in a full-screen manner or displayed in a window manner. The full-screen manner refers to a manner in which a window covers a display area of an entire screen. The window manner refers to a manner in which a window only covers a display area of a partial screen, e.g., a window is located in the middle of the screen, and an area of a partial screen around the window is still visible. For example, the state of displaying a window of a Google Maps application as the application may be a state in which a Google Maps application is displayed in a full-screen manner on the screen of the mobile terminal device, or a state in which a Google Maps application is displayed in a window manner, or a state in which a Google Maps application and a SMS application are displayed in a tiled or cascaded windows manner.

The standby state may be a state in which the screen displays a main user interface, and may be a state in which none of the window of any application is displayed on the screen.

The preset operation is used for creating an application template corresponding to an application corresponding to a currently displayed window on a screen of a mobile terminal device. In certain embodiments, the preset operation may be synchronous touch control of a combination of two or more random touch function buttons (such as a menu button, a HOME button, a return button, and a search button) on a mobile terminal device, or synchronous touch control or sequential touch control of at least one touch function button and at least one preset display area on the screen. Alternatively, the preset operation may be synchronously pressing at least two buttons of a volume up button, a power button, and a mute button.

Step S42: The mobile terminal device creates the application template corresponding to the application corresponding to the window currently displayed on the screen.

If one application is currently displayed, the application template corresponds to the one application. If a plurality of applications is displayed currently, the application template corresponds to the plurality of applications.

The application template corresponding to the application may include any information that can be used to identify the application, for example, one or more of an image, text, animation, a video, and the like. The application template may be automatically generated, or may also be determined by the user according to demands. For example, the windows currently opened on a screen include a window of a Google Maps application and a window of a SMS application. After receiving a command of creating an application template corresponding to the two applications, the mobile terminal device may generate an application template corresponding to the two applications. In addition, the user may further select one or more specific images, text or the like as an application template corresponding to the two applications, as long as the specific images or text can be used to identify the two applications.

After the application template is launched, content of the window displayed on the screen may be different from content of the window displayed on the screen when the application template is created, or may also be identical with the content of the window displayed on the screen when the application template is created. In certain embodiments, after the application template is launched, the content of the window displayed on the screen is the content of a main page of the application after the corresponding application is opened. In certain embodiments, after the application template is launched, the content of the window displayed on the screen is identical with the content of the window displayed on the screen when the application template is created.

Step S43: The mobile terminal device saves the application template in a specified area.

The created application template is saved in the specified area. In certain embodiments, the specified area may be, for example, a specified interface or a specified position in a menu interface. For example, the created application template may be saved in a specified interface, which may be opened by touching a preset button or preset area on the interface of the screen home, and different application templates in the specified interface may be arranged in a list manner or a tile manner. In certain embodiments, the application template may also be saved in other manners.

In addition, a step of editing an application template may be further included prior to or after the Step S43. For example, prior to Step S43, after the application template corresponding to the application currently displayed on the screen is created, a dialog box may pop up on the screen. The dialog box includes an editable field, and the user can input in the editable field a name to give to an application template or other information. The dialog box may further include a confirmation button and/or a return button, such that after inputting in the editable field the name to give to the application template or other information, the user may confirm and/or cancel the input by using the confirmation button and/or the return button.

In one embodiment, detailed information of the application template, for example, a list of the applications to which the application template corresponds, may further be displayed by clicking on the application template for a long time (e.g., clicking to exceed a preset time).

Figure 5:
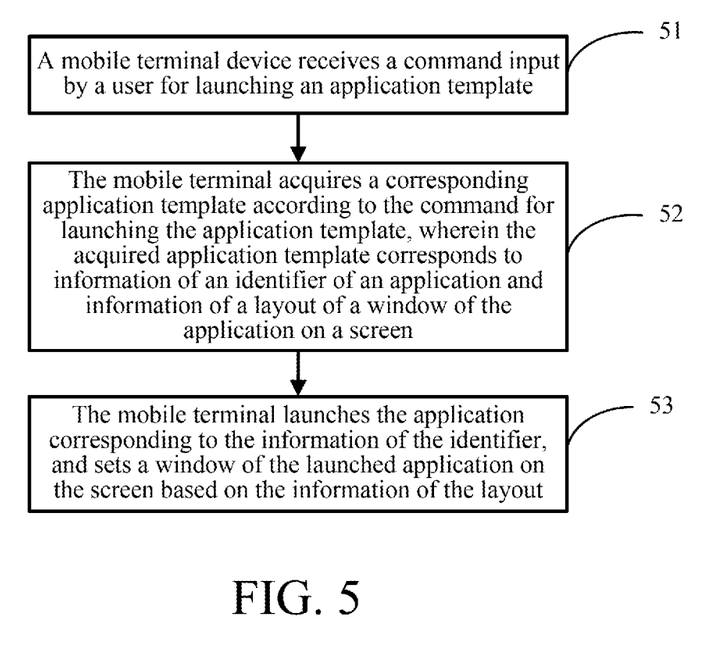
FIG. 5 is a schematic flow chart of a method of launching an application template according to one embodiment of the present disclosure.

FIG. 5 is a schematic flow chart of a method of launching an application template according to one embodiment of the present disclosure. As shown in FIG. 5, the method may include the following steps:

Step 51: A mobile terminal device receives a command input by a user for launching an application template.

During implementation, to launch an application template, the user may retrieve an interface where the application template is located. In certain embodiments, the retrieval manner of the application template may be a menu manner, a key combination manner or a shortcut key manner, and the mobile terminal device may receive a command for launching an application template input by the user in one of the foregoing manners.

In one embodiment, in the Step 51, the mobile terminal device presents a thumbnail of the application template in an application template list. Then the mobile terminal device may receive the command for launching the application template input by the user according to the thumbnail in the application template list.

Step 52: The mobile terminal device acquires, according to the received command for launching the application template, a corresponding application template.

In one embodiment, the application template may include information of an identifier of the application, and may include information of a layout of a window of each of the applications on the screen.

Step 53: The mobile terminal device launches the application corresponding to the information of the identifier, and sets the window of the launched application on the screen based on the information of the layout.

In one embodiment, in Step 53, the mobile terminal device acquires information of a launch position of the application, corresponding to the information of the identifier, in the application template; and launches, according to the acquired information of the launch position, the application corresponding to the information of the identifier.

In one embodiment, in Step 53 in the foregoing, the mobile terminal device acquires information of a layout of an application, corresponding to the information of the identifier, in the application template and information for indicating a focus window, and sets, on the screen based on the information of the layout, the window of the launched application, and sets the window indicated by the information for indicating the focus window in focus.

During a specific implementation, the mobile terminal device retrieves AppInfoArrary in the application template, launches an application according to appLocation, and sets a window of the application based on appPosition. If content exists in appDisplay, the mobile terminal device displays a specific page in the application according to the content of the appDisplay. If no content exists in appDisplay, the mobile terminal device ignores this item, and if appFocus indicates that this application is in focus, the mobile terminal device sets the window of the application in focus.

It should be noted that among the parameters of AppInfoArrary, appLocation corresponds to a launch position of the application, appDisplay corresponds to Intent (which is an abstract description of an operation to be performed, and is generally used in the launching of activities) required for launching a page, and appPosition corresponds to a position and a size of the window of the application. When the application is launched, the application can be launched and a page where the application is located can be reached through direct launch according to the Intent.

In addition, the Step 53 may further be performed in the following manner: the mobile terminal device launches a corresponding application according to the information of the identifier. Content of the window of the application being launched may be different from content of the window when the application template is created. For example, the content of the window may be content of the window of a main page of the application after the application is launched. The position of the window of the application being launched may also be different from a position of the window when the application template is created.

It should be noted that, FIGS. 1-5 only show a plurality of embodiments, rather than all of the embodiments, of the present disclosure. For clarity purposes, the steps in the embodiments as described are listed. However, the steps are not limited to the sequence as described in FIGS. 1-5, and they may be performed synchronously or in other manners, which all fall within the protection scope of the present disclosure. In addition, the steps in different embodiments may further be combined with each other to obtain other embodiments, which also fall within the protection scope of the present application. It should be noted that for simplicity purposes, technical terms in some of the embodiments are explained in detail, whereas technical terms in some other embodiments are not explained in detail. However, unless otherwise indicated, the same technical terms in the present application generally represent the same meaning. In addition, the solution as described in the embodiments of the present disclosure may be applied to a mobile terminal device based on various intelligent operating systems, such as a mobile terminal device based on an Android system, an iOS system, a Symbian system, a Windows Phone system, a Sailfish OS system, an Ubuntu Touch system or any other mobile operating systems.

Figure 6:
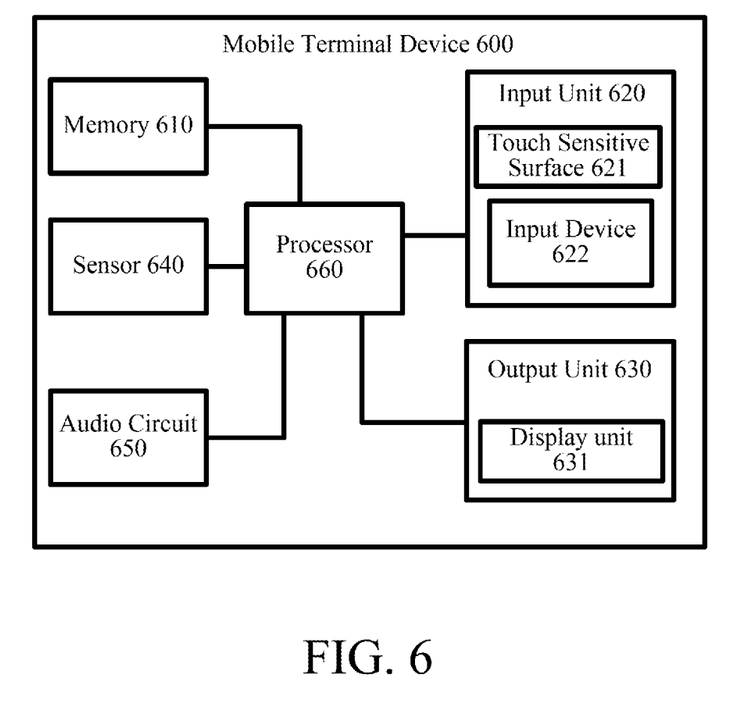
FIG. 6 is a schematic structural view of a mobile terminal device according to one embodiment of the present disclosure.

In one aspect of the present disclosure, a mobile terminal device is provided. In certain embodiments, the mobile terminal device may include one or more processors and a memory. In certain embodiments, the memory is a non-transitory computer-readable medium. One or more computer readable codes are stored in the memory. The one or more computer readable codes, when executed at the one or more processors, cause the mobile terminal device to perform one or more of the methods of the disclosure. As an example, a mobile terminal device implementing the method according to the embodiment as described in FIG. 1 is illustrated in FIG. 6. Reference may be made to the following content for manners of implementing other embodiments.

In this exemplary embodiment, the mobile terminal device include one or more processors and a memory storing one or more computer readable codes. The one or more processors are configured to execute the one or more computer readable codes such that the mobile terminal device receives a command input by a user for requesting to create the application template, where the application template is configured to indicate at least one application to be launched and a layout of a window of each of the at least one application to be launched on a screen, and to instruct launching of the at least one application; acquires information of identifiers of all of the applications currently displayed on the screen and information of the layout of the window of each of the applications on the screen according to the command for requesting to create the application template; and creates the application template according to the command for requesting to create the application template, wherein the application template corresponds to the acquired information of the identifiers of the applications and the information of the layout of the window of each of the applications on the screen.

In one embodiment, the mobile terminal device, after acquiring the information of the identifiers and the information of the layout and prior to creating the application template, further generates a thumbnail according to content currently displayed on the screen, where the application template further comprises the generated thumbnail.

In one embodiment, the mobile terminal device further receives a command input by the user for updating the application template; retrieves the application template corresponding to the command for updating the application template; and updates the retrieved application template according to the command for updating the application template.

In one embodiment, the mobile terminal device further receives a command input by the user for deleting the application template; and deletes the application template corresponding to the command for deleting the application template.

In one embodiment, the application template further corresponds to information of a launch position of the at least one application and/or information for indicating a focus window, where the information for indicating the focus window is configured to indicate a window in focus. An embodiment of the structure of the mobile terminal device may be shown in FIG. 6. In certain embodiments, the mobile terminal device refers to a portable or mobile electronic or electromechanical hardware device which is capable of performing mobile communication, such as wireless communication, for entering data into, and displaying data from, a computing device or a computing system. In certain embodiments, the terms "mobile terminal device," "mobile terminal" and "mobile device" may be interchangeable. The mobile terminal device 600 may be various handheld devices (such as a mobile phone, a tablet computer, and a PDA), and may include components such as a processor with one or more processing cores, a radio frequency circuit, a memory including one or more computer readable storage media, an input device, a display device, a sensor, an audio circuit, a WiFi module, and an power supply. Persons skilled in the art may understand that the structure of the mobile terminal device 600 in this embodiment does not constitute a limitation, and may include more or fewer components. In certain embodiments, some components may be combined, and components may be arranged differently.

The radio frequency circuit may be used for receiving and sending signals during receiving and sending of information or a call, and particularly, after downlink information of a base station is received, the downlink information is forwarded to the one or more processors for processing. In addition, data involving uplink is sent to the base station. Usually, the radio frequency circuit includes, but is not limited to, an antenna, at least one amplifier, a tuner, one or more oscillators, a subscriber identity module (SIM) card, a transceiver, a coupler, a Low Noise Amplifier (LNA), a duplexer, and the like. In addition, the radio frequency circuit may further communicate with other devices by using wireless communication and a network. The wireless communication may use any communication standard or protocol, which includes, but is not limited to, Global System for Mobile Communications (GSM), General Packet Radio Service (GPRS), Code Division Multiple Access (CDMA), Wideband Code Division Multiple Access (WCDMA), Long Term Evolution (LTE), e-mails, Short Messaging Service (SMS), and the like.

The memory may be used for storing software programs and modules. The processor executes various functional applications and data processing by running the software programs and modules stored in the memory. The memory may mainly include a program storage area and a data storage area. The program storage area may store an operating system and an application required by at least one function (such as an audio playback function, or an image playback function). The data storage area may store data (such as audio data or a phone book) created according to the use of the mobile terminal device 600. In addition, the memory may include a high-speed random access memory, and may further include a nonvolatile memory, for example, at least one disk storage device, a flash memory device, or other volatile solid-state storage devices. Correspondingly, the memory may further include a memory controller to provide access to the memory for the processor and input device.

The input device may be used for receiving input numerical information or character information, and generating keyboard, mouse, joystick, optical or trackball signal input relevant to user setting and function control. Specifically, the input device may include a touch sensitive surface and another input device. The touch sensitive surface, also called a touch display screen or a touch panel, may collect a touch operation of the user on or near the touch sensitive surface (for example, an operation of the user on the touch sensitive surface or near the touch sensitive surface with a finger, a stylus, and any suitable object or accessory), and drive a corresponding connection apparatus according to a preset program. In one embodiment, the touch sensitive surface may include a touch detection apparatus and a touch controller. The touch detection apparatus detects a position touched by the user, detects a signal brought about by the touch operation, and transfers the signal to the touch controller. The touch controller receives touch information from the touch detection apparatus, converts the touch information into contact coordinates, and then sends the contact coordinates to the processor, and may receive a command sent by the processor and execute the command. In addition, the touch sensitive surface may be implemented with multiple types such as resistive, capacitive, infrared, and surface acoustic wave types. In addition to the touch sensitive surface, the input device may further include another input device. Specifically, the other input device may include, but is not limited to, one or more of a physical keyboard, a function key (such as a volume control key or a switch key), a trackball, a mouse, and a joystick.

The display device may be used for displaying information input by the user or information provided for the user and various graphical user interfaces of the mobile terminal device 100, and these graphical user interfaces may be formed of an image, text, an icon, a video, and a combination thereof. The display device may include a display panel, and optionally, the display panel may be configured in forms such as a Liquid Crystal Display (LCD) or an Organic Light-Emitting Diode (OLED). Further, the touch sensitive surface may cover the display panel. After detecting a touch operation on or near the touch sensitive surface, the touch sensitive surface transfers the touch operation to the processor to determine the type of a touch event, and then the processor provides corresponding visual output on the display panel according to the type of the touch event. Although in this embodiment, the touch sensitive surface and the display panel implement input and input functions as two separate members; however, in certain embodiments, the touch sensitive surface and the display panel may be integrated to implement input and output functions.

The mobile terminal device 600 may further include at least one sensor, for example, an optical sensor, a motion sensor, an acoustic sensor, and other sensors. Specifically, the optical sensor may include an ambient light sensor and a proximity sensor. The ambient light sensor may adjust brightness of the display panel according to brightness of ambient light. The proximity sensor may turn off the display panel and/or backlight when the mobile terminal device 600 is moved near the ear. As one kind of motion sensor, an accelerometer may detect the magnitude of acceleration in various directions (generally triaxial), may detect the magnitude and direction of gravity in the stationary state, and may be used for applications recognizing a posture of a mobile phone (such as switching between landscape and portrait screen orientations, related games, or magnetometer posture calibration), may vibrate to recognize related functions (for example, a pedometer, or tapping) and the like. Other sensors such as a gyroscope, a barometer, a hygrometer, a thermometer, an infrared sensor that may be configured on the mobile terminal device 600 are not repeated herein.

The audio circuit, a loudspeaker, and a microphone may provide an audio interface between the user and the mobile terminal device 600. The audio circuit may convert received audio data into an electric signal, and then transmit the electric signal to the loudspeaker, and the loudspeaker converts the electric signal into a sound signal for output. On the other hand, the microphone converts the collected sound signal into an electric signal, the audio circuit receives the electric signal and then converts the electric signal into audio data, and after being output to the processor for processing, the audio data is sent to, for example, another apparatus by using the radio frequency circuit, or the audio data is output to the memory for further processing. The audio circuit may further include an earphone jack to provide communication between a peripheral earphone and the mobile terminal device 600.

WiFi is a short-range wireless transmission technology, and the mobile terminal device 600 may help a user to receive and send an e-mail, browse a webpage, and access streaming media through the WiFi module, which provides wireless broadband Internet access for the user. Although the WiFi module is given in this embodiment, it may be understood that the WiFi module is not an essential component of the mobile terminal device 600, and may be completely omitted without changing the essential scope of the disclosure as required.

The processor is a control part of the mobile terminal device 600, connects various parts by using various interfaces and lines, and executes various functions of the mobile terminal device 600 and processes data by running or executing software programs and/or modules stored in the memory, and invoking data stored in the memory, thereby monitoring the mobile phone as a whole. In one embodiment, the processor may include one or more processing cores. In one embodiment, the processor may integrate an application processor and a modem processor. The application processor mainly processes the operating system, user interfaces, and applications, and the modem processor mainly processes wireless communication. It may be understood that, the modem processor may also be not integrated into the processor.

As one example, as shown in FIG. 6, the mobile terminal device 600 may include a memory 610, a sensor 640, a processor 660, an audio circuit 650, an input unit 620, and an output unit 630. The input unit 620 may include a touch sensitive surface 621 and another input device 622, and the output unit 630 may include a display unit 631. It should be noted that the mobile terminal device 600 may be used to perform any of the methods as described in the present disclosure.

In addition, the mobile terminal device 600 may further include a power supply (for example, a battery) for supplying power to various members. In one embodiment, the power supply may be logically connected to the processor through a power management system, so as to implement functions such as charging management, discharging management, and power consumption management through the power management system. The power supply may further include one or more of random components such as a direct current or alternating current power supply, a rechargeable system, a power supply failure detection circuit, a power supply converter or inverter, and a power supply state indicator.

The present disclosure is described with reference to flow charts and/or block diagrams of the methods, devices (systems), and computer program products according to the embodiments of the present disclosure. It should be understood that each procedure and/or block in the flow charts and/or block diagrams and a combination of procedures and/or blocks in the flow charts and/or block diagrams may be implemented with computer program instructions. These computer program instructions may be provided to a general purpose computer, a dedicated computer, an embedded processor or processors of other programmable data processing devices, so that one procedure or a plurality of procedures in the flow charts and/or a function specified in one or more blocks in the block diagrams may be implemented through the instruction executed by the processor in the computer or other programmable data processing devices.

These computer program instructions may also be stored in a computer readable memory that can guide the computer or other programmable data processing devices to work in a specific manner, so that the instructions stored in the computer readable memory generate a product including an instruction apparatus, and the instruction apparatus implements one or more procedures in the flow charts and/or a function specified in one or more blocks in the block diagrams.

These computer program instructions may also be loaded in computers or other programmable data processing devices, so as to execute a series of operation steps on the computers or other programmable devices to produce processing implemented with computers, so that the instructions executed in the computers or other programmable devices provide steps used for implementing one or more procedures in the flow charts and/or a function specified in one or more blocks in the block diagrams.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the disclosure pertains without departing from its spirit and scope. Accordingly, the scope of the disclosure is defined by the appended claims rather than the foregoing description and the exemplary embodiments described therein.

What is claimed is:

1. A method for configuring an application template, comprising:
   receiving, by a mobile terminal device, a command input by a first user for requesting to create the application template, wherein the application template is used to indicate at least one application to be launched and a layout of a window of each of the at least one application to be launched on a screen, and to instruct launching of the at least one application;
   determining, by the mobile terminal device, whether a specified application is already and currently launched on the screen of the mobile terminal device;
   in response of determining that the specified application is already and currently launched on the screen of the mobile terminal device, acquiring, by the mobile terminal device, information of identifiers of all applications currently displayed on the screen and information of the layout of the window of each of the applications on the screen according to the command for requesting to create the application template;
   in response of determining that the specified application is not already and currently launched on the screen of the mobile terminal device, reminding, by the mobile terminal device and according to the received command for requesting to create the application template, the user to input the information of the identifier of the application to be launched and the information of the layout of the window of the application to be launched on the screen of the mobile terminal device; and
   creating, by the mobile terminal device, the application template according to the command for requesting to create the application template, wherein the application template corresponds to the acquired information of the identifiers of the applications and the information of the layout of the window of each of the applications on the screen, wherein the application template further corresponds to information of a launch position of the at least one application and information for indicating a focus window, wherein the information for indicating the focus window is configured to indicate a window in focus, and wherein the command for requesting to create the application template corresponding to the information of the layout of the window of each of the applications on the screen comprises a preset operation, wherein the preset operation comprises one of:
   pressing a preset operation button on the mobile terminal device,
   touching or dragging a preset area or a preset identifier on a screen of the mobile terminal device,
   synchronously touching a combination of two or more random touch function buttons on the mobile terminal device,
   synchronously touching or sequentially touching at least one touch function button and at least one preset display area on the screen of the mobile terminal device, and
   synchronously pressing at least two buttons of a volume up button, a power button, and a mute button of the mobile terminal device.

2. The method according to claim 1, after the step of acquiring the information of the identifiers and the information of the layout of the window of each of the applications and prior to the step of creating the application template, further comprising:
   generating, by the mobile terminal device, a thumbnail according to content currently displayed on the screen;
   wherein the application template further comprises the generated thumbnail.

3. The method according to claim 1, further comprising: receiving, by the mobile terminal device, a command input by a second user for updating the application template;
   retrieving, by the mobile terminal device, the application template corresponding to the command for updating the application template; and
   updating, by the mobile terminal device, the retrieved application template according to the command for updating the application template.

4. The method according to claim 1, further comprising: receiving, by the mobile terminal device, a command input by a third user for deleting the application template; and
   deleting, by the mobile terminal device, the application template corresponding to the command for deleting the application template.

5. The method according to claim 1, wherein for each of the applications currently displayed on the screen, the information of the identifiers corresponds to the name of each of the applications and content currently displayed in the windows of the applications, and the information of the layout of the window of each of the applications on the screen corresponds to size and position of the window of each of the application on the screen.

6. A method for launching an application template, comprising:
   receiving, by a mobile terminal device, a command input by a user for launching the application template, wherein the step of receiving the command for launching the application template comprises: presenting, by the mobile terminal device, a thumbnail of the application template in an application template list, and receiving, by the mobile terminal device, the command input for launching the application template by the user according to the thumbnail in the application template list;
   acquiring, by the mobile terminal device, a corresponding application template according to the received command for launching the application template, wherein the acquired application template corresponds to information of an identifier of an application and information of a layout of a window of the application on a screen;

launching, by the mobile terminal device, the application corresponding to the information of the identifier; and setting, by the mobile terminal device, the window of the launched application on the screen based on the information of the layout of the window of the applications, wherein the step of setting the window of the launched application on the screen based on the information of the layout comprises: acquiring, by the mobile terminal device, the information of the layout of the window of the application and information for indicating a focus window corresponding to the information of the identifier in the application template, wherein the information for indicating the focus window is configured to indicate a window in focus, and setting the window indicated by the information for indicating the focus window in focus, and wherein the command for launching the application template corresponding to the information of the layout of the window of the applications on the screen comprises a preset operation, wherein the preset operation comprises one of:

pressing a preset operation button on the mobile terminal device, touching or dragging a preset area or a preset identifier on a screen of the mobile terminal device, synchronously touching a combination of two or more random touch function buttons on the mobile terminal device, synchronously touching or sequentially touching at least one touch function button and at least one preset display area on the screen of the mobile terminal device, and synchronously pressing at least two buttons of a volume up button, a power button, and a mute button of the mobile terminal device.

7. The method according to claim 6, wherein the step of launching the application corresponding to the information of the identifier comprises:

acquiring, by the mobile terminal device, information of a launch position of the application corresponding to the information of the identifier in the application template; and launching, by the mobile terminal device, the application corresponding to the information of the identifier according to the retrieved information of the launch position.

8. The method according to claim 6, wherein the information of the identifier of the application corresponds to the name of the application and content currently displayed in the window of the application, and the information of the layout of the window of the application on the screen corresponds to size and position of the window of the application on the screen.

9. A mobile terminal device, comprising:
one or more processors;
a memory storing one or more computer readable codes which, when executed by the one or more processors, cause the mobile terminal device to perform a method comprising:
receiving, by the mobile terminal device, a command input by a first user for requesting to create an application template, wherein the application template is configured to indicate at least one application to be launched and a layout of a window of each of the at least one application to be launched on a screen, and to instruct launching of the at least one application;

determining, by the mobile terminal device, whether a specified application is already and currently launched on the screen of the mobile terminal device;

in response of determining that the specified application is already and currently launched on the screen of the mobile terminal device, acquiring, by the mobile terminal device, information of identifiers of all of the applications currently displayed on the screen and information of the layout of the window of each of the applications on the screen according to the command for requesting to create the application template;

in response of determining that the specified application is not already and currently launched on the screen of the mobile terminal device, reminding, by the mobile terminal device and according to the received command for requesting to create the application template, the user to input the information of the identifier of the application to be launched and the information of the layout of the window of the application to be launched on the screen of the mobile terminal device; and creating, by the mobile terminal device, the application template according to the command for requesting to create the application template, wherein the application template corresponds to the acquired information of the identifiers of the applications and the information of the layout of the window of each of the applications on the screen, wherein the application template further corresponds to information of a launch position of the at least one application and information for indicating a focus window, wherein the information for indicating the focus window is configured to indicate a window in focus, and wherein the command for requesting to create the application template corresponding to the information of the layout of the window of each of the applications on the screen comprises a preset operation, wherein the preset operation comprises one of:

pressing a preset operation button on the mobile terminal device, touching or dragging a preset area or a preset identifier on a screen of the mobile terminal device, synchronously touching a combination of two or more random touch function buttons on the mobile terminal device, synchronously touching or sequentially touching at least one touch function button and at least one preset display area on the screen of the mobile terminal device, and synchronously pressing at least two buttons of a volume up button, a power button, and a mute button of the mobile terminal device.

10. The mobile terminal device according to claim 9, wherein the method, after the step of acquiring the information of the identifiers and the information of the layout of the window of each of the applications and prior to the step of creating the application template, further comprises:

generating, by the mobile terminal device, a thumbnail according to content currently displayed on the screen;

wherein the application template further comprises the generated thumbnail.

11. The mobile terminal device according to claim 9, wherein the method further comprises:

receiving, by the mobile terminal device, a command input by a second user for updating the application template;

retrieving, by the mobile terminal device, the application template corresponding to the command for updating the application template; and updating, by the mobile terminal device, the retrieved application template according to the command for updating the application template.

12. The mobile terminal device according to claim 9, wherein the method further comprises:

receiving, by the mobile terminal device, a command input by a third user for deleting the application template; and deleting, by the mobile terminal device, the application template corresponding to the command for deleting the application template.

13. The mobile terminal device according to claim 9, wherein the application template further corresponds to information of a launch position of the application, such that the mobile terminal device is configured to perform launching the application corresponding to the information of the identifier according to the retrieved information of the launch position.

14. The mobile terminal device according to claim 9, wherein for each of the applications currently displayed on the screen, the information of the identifiers corresponds to the name of each of the applications and content currently displayed in the windows of the applications, and the information of the layout of the window of each of the applications on the screen corresponds to size and position of the window of each of the application on the screen.

15. The mobile terminal device according to claim 9, further comprising at least one sensor.

16. The mobile terminal device according to claim 15, wherein the at least one sensor comprising at least one of an optical sensor, a motion sensor, and an acoustic sensor.

* * * * *